(No Model.)
F. A. RUHL.
DEVICE FOR DESTROYING INSECTS ON PLANTS.
No. 329,957. Patented Nov. 10, 1885.
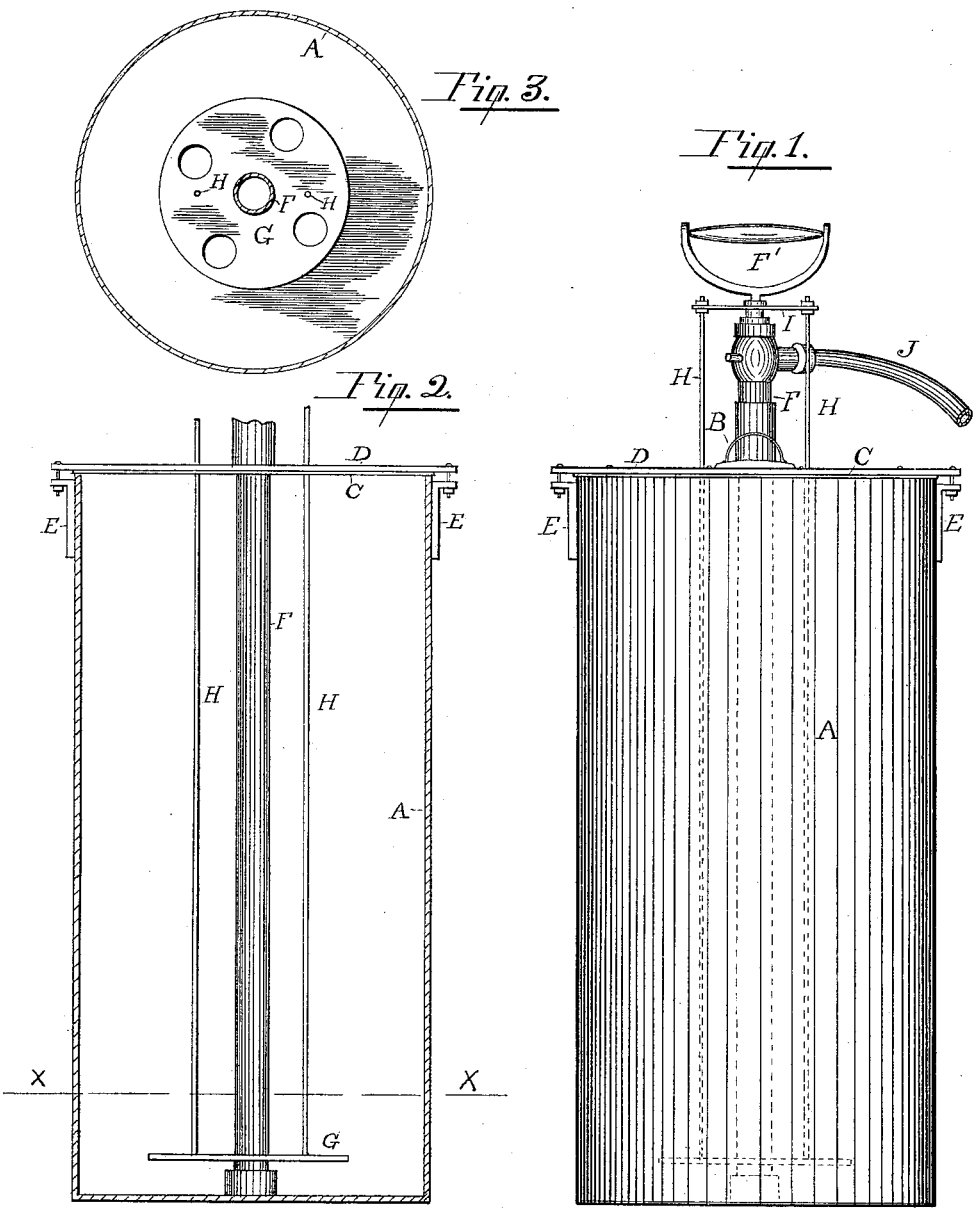

United States Patent Office.

FRED A. RUHL, OF STOCKTON, CALIFORNIA.

DEVICE FOR DESTROYING INSECTS ON PLANTS.

SPECIFICATION forming part of Letters Patent No. 329,957, dated November 10, 1885.

Application filed June 1, 1885. Serial No. 167,244. (No model.)

*To all whom it may concern:*

Be it known that I, FRED A. RUHL, a citizen of the United States, residing at Stockton, in the county of San Joaquin and State of California, have invented certain new and useful Improvements in Devices for and Methods of Destroying Insects on Plants, of which the following is a specification, reference being had therein to the accompanying drawings.

My invention relates to insect-destroyers, and is designed to produce a device for the purpose that shall thoroughly mix the ingredients before ejection on the plants.

It consists, in its essential features, of any appropriate tank or receptacle for a fluid, which fluid consists of water and any liquid preparation adapted to kill insects, and of the attachment to the tank of any pumping device having attached to it agitators serving to thoroughly mingle the water and the preparation during the process of pumping and forcing the mixture in the shape of spray upon the plants.

Referring to the accompanying drawings, Figure 1 is a perspective view. Fig. 2 is a section of main portion of tank and plunger. Fig. 3 is a vertical section through the lines $x$ $x$ of Fig. 2.

Let A represent a tank, which is preferably of metal, and cylindrically shaped; F, the pump, which is inserted through C, the top of the tank A. The top C has an iron cross-piece, D, attached to it, the ends of which are bolted to ears E on the tank, so that the top C may be readily removed.

B is the stopple of the supply-hole in top of the tank A in its cover C. To the handle F' of the pump F is a cap-piece, I, having vertical rods H H, extending downward parallel with pump F, and having attached at their ends a dasher, G, in the center of which is a hole allowing it to be placed in position upon the pump F, so that when the handle F' is worked up and down the dasher G, attached to the rods H, follows the motions of the handle.

J is a hose, attached to the nozzle of the pump F, through which the mixture is forced upon the plants. Upon the end of this hose D any appropriate device may be attached for the formation of spray.

The water and any liquid preparation destructive to insects are supplied into the tank A, and by the movements of the pump-handle F' is kept thoroughly mingled by the dasher G, so that when it is ejected upon the plants it is of uniform strength at all points, and obviates all danger of injuring the plants by the solution being stronger when applied at some points than at others, as has heretofore been the case by methods in vogue.

I do not limit myself to the precise construction of parts herein described, as it is obvious that many deviations may be made without departing from the essence of my invention.

Having thus described my invention, what I claim as new, and desire to secure by Letters Patent, is—

1. The combination, with a tank, of a pump contained therein, and an agitator connected to and operated by said pump and contained within said tank, substantially as and for the purpose specified.

2. The combination, with a tank, of a pump resting therein, a removable top, through which the said pump projects, a cap-piece on the handle of the pump, a dasher or agitator encircling the pump within the tank, and rods connecting the cap-piece and dasher, the whole operating substantially as and for the purpose specified.

In testimony whereof I affix my signature in presence of two witnesses.

FRED A. RUHL.

Witnesses:
 HIRAM E. MIDDLEHAUFF,
 ELIHU B. STOWE.